United States Patent
Horibe

(10) Patent No.: US 7,123,577 B2
(45) Date of Patent: Oct. 17, 2006

(54) OPTICAL DISK, OPTICAL DISK ACCESS DEVICE AND ACCESS METHOD

(75) Inventor: Koji Horibe, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 328 days.

(21) Appl. No.: 10/819,263

(22) Filed: Apr. 7, 2004

(65) Prior Publication Data

US 2004/0193792 A1 Sep. 30, 2004

Related U.S. Application Data

(63) Continuation of application No. PCT/JP01/09306, filed on Oct. 23, 2001.

(51) Int. Cl.
  G11B 7/24 (2006.01)
  G11B 5/09 (2006.01)

(52) U.S. Cl. .............. 369/275.3; 369/47.22; 711/112

(58) Field of Classification Search .......... 369/275.3, 369/275.1, 275.4, 47.22, 44.28, 44.26, 47.28, 369/53.34, 53.37, 44.34, 53.15, 53.17, 47.1, 369/44.33; 386/126; 711/112, 163

See application file for complete search history.

(56) References Cited

U.S. PATENT DOCUMENTS

| | | | |
|---|---|---|---|
| 6,493,302 B1 * | 12/2002 | Takahashi | 369/53.15 |
| 6,564,009 B1 * | 5/2003 | Owa et al. | 386/126 |
| 6,631,106 B1 * | 10/2003 | Numata et al. | 369/53.17 |
| 7,072,259 B1 * | 7/2006 | Yanagi | 369/47.22 |

FOREIGN PATENT DOCUMENTS

| | | |
|---|---|---|
| EP | 1067553 | 1/2001 |
| EP | 1113443 | 7/2001 |
| JP | 5-174498 | 7/1993 |
| JP | 3004095 | 8/1994 |
| JP | 2001-023177 | 1/2001 |
| JP | 2001-143268 | 5/2001 |
| JP | 2001-189019 | 7/2001 |

OTHER PUBLICATIONS

Notification of Transmittal of Copies of Translation of the International Preliminary Examination Report (1 page) and English language PCT International Preliminary Examination Report, (3 pages), dated Mar. 25, 2002.

* cited by examiner

Primary Examiner—Ali Neyzari
(74) Attorney, Agent, or Firm—Staas & Halsey

(57) ABSTRACT

An optical disk having an increased data storage capacity and accessible randomly, the positional shift of which can be quickly detected. An optical disk access device and access method are also disclosed. The optical disk (1) has a track (T1) constructed of two kinds of the first sector (S1) having an ID portion (12) and succeeding sectors (S2) having only a sector mark portion (13), and sector marks of the tracks are different from one another. The data area is increased by compressing the ID portion, and the different marks of the tracks enable quick detection of access positional shift.

13 Claims, 13 Drawing Sheets

FIG.8
EXAMPLE 1
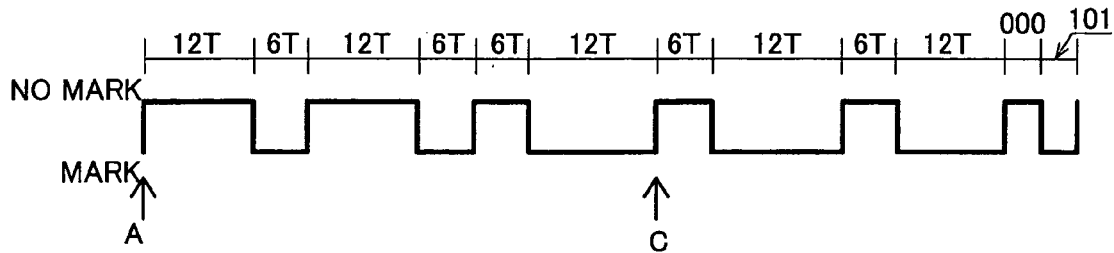
EXAMPLE 2
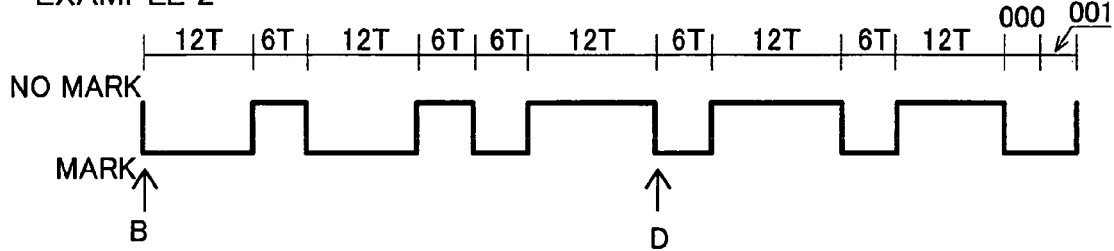
EXAMPLE 3
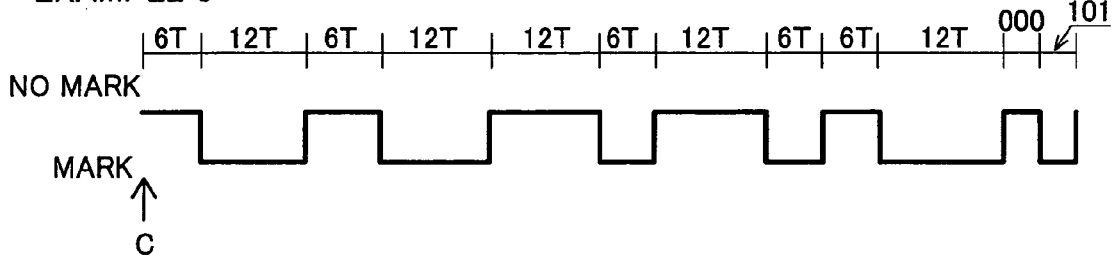
EXAMPLE 4
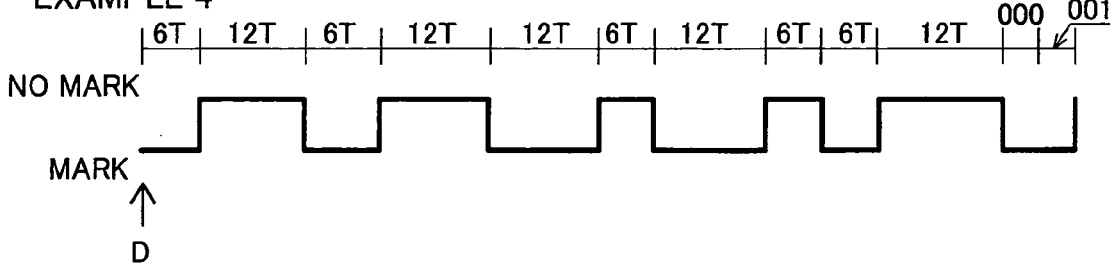

OPTICAL DISK, OPTICAL DISK ACCESS DEVICE AND ACCESS METHOD

CROSS-REFERENCE TO RELATED APPLICATIONS

This application is a continuation application based upon and claims the benefit of the prior PCT International Patent Application No. PCT/JP01/09306 filed on Oct. 23, 2001, the entire contents of which are incorporated herein by reference.

BACKGROUND OF THE INVENTION

1. Field of the Invention

The present invention relates to a recording medium represented by an optical disk optically rewritable, an access device and an access method. More particularly, the present invention relates to an optical disk which enables a quick random access operation if the disk is formed into a large capacity, an access device and an access method.

2. Description of Related Art

Conventionally, there is a recording medium provided with data identification information for each information unit of a predetermined data length in order to carry out a random access operation to data on a medium. The typical examples are such optical disks as magneto optic disk (hereinafter referred to as MO) using magneto optic recording and DVD disk (hereinafter referred to as DVD), which uses a change in phase of the medium. These optical disks are used as a large-scale external recording medium for computer. Additionally, they are used for recording visual information such as movie. As the computer has handled larger and larger data or higher-quality, longer-hour visual recording has been demanded, a further larger capacity has been demanded.

An optical disk 100 based on the conventional art shown in FIG. 9 is so constructed that information unit group constituted of plural information units are composed of tracks T100, which are formed of each single circle, the tracks being formed spirally. Each track T100 is divided to sectors S100 as information unit, which has a predetermined data length, so that data recording format is constructed. In an enlarged view of four tracks 100A on the optical disk 100 shown in FIG. 9, the sector S100 comprises data portion 120 which is a region in which data is to be written and control information portion 110, which includes ID portion 112 as data identification information for identifying the content of the data portion 120 and a sector mark portion 111 which is recognition information for recognizing the start position of the sector S100.

FIG. 10 shows an enlarged view of the bit structure on a boundary region of the control information portion 110 and data portion 120 on the optical disk 100. Referring to FIG. 10, data is recorded on only land L100 on the data portion 120 of the optical disk 100. In the meantime, although not indicated, data may be recorded in only the groove G100. Here, each data bit pattern 125 in the data portion 120 is a rewritable data pattern, which is constructed by magneto optic recording in case of MO or phase change recording in case of DVD. Contrary to this, the sector mark portion 111 on the control information portion 110 and each control information bit pattern 115 on the ID portion 112 are uneven patterns processed in the disk 100 by etching or the like, that is, a fixed pattern constituted of so-called emboss pit pattern. As for the data bit pattern 125, as compared to beam spot such as pick-up laser beam or the like, even if the bit pattern size or the bit pattern pitch is miniaturized, data reading corresponding to highly integration of the data bit pattern 125 is enabled by development of so-called magnetic super-resolution (MSR) technology or the like, which reads out by using temperature distribution in a beam spot.

Next, FIG. 11 shows a high-density optical disk 200 in case where the data portion 220 is formed in high density. An enlarged view of four tracks 200A like the case of FIG. 9 is shown here. The high-density optical disk 200 adopts a land groove recording type as shown in FIG. 12 for integration into a higher density. The data bit pattern 125 (see FIG. 10), which has conventionally been recorded in only the land L100 or the groove G100, is recorded both in the land L200 and groove G200 by narrowing the bit pattern pitch using magnetic super-resolution (MSR) technology and the like. Thus, as compared to a case where the track T100 is constituted of any one of the land L100 or the groove G100 (see FIGS. 9, 10), the quantity of the tracks T200 constituted of both the land L200 or the groove G200 is doubled thereby achieving high density.

However, because in case of the control bit pattern 115, 215, the bit pattern is formed with the emboss pit pattern at the time of manufacturing the optical disk 100 and the high density optical disk 200 as compared to the data bit patterns 125, 225, processing accuracy in manufacturing process needs to be improved for miniaturization and however, the miniaturization has not been progressed. Therefore, the pitch of the track T100 on which the data bit pattern 125 is to be recorded in the optical disk 100 is specified by the size of the emboss pit pattern of the control bit pattern 115, so that achievement of high density cannot be attained, which is a problem to be solved.

In the high-density optical disk 200 intending to achieve high density shown in FIG. 11, a control information portion 210 is assigned to a two-truck width consisting of two lands L200 and two grooves G200 and the control information portion 210 and the two-truck width are arranged in a row. That is, subsequent to a sector mark portion 211, two ID portions 212, 213 are arranged in line to record. In the data portion 220, the ID portion 212 is allocated as data identification information of the data 222 and the ID portion 213 is allocated as data identification information of the data 223. With miniaturization of the data bit pattern 225 in the high density optical disk 200, the overhead of the control information portion 210 in the track T200 is increased, thereby obstructing intensification in the density of the high density optical disk 200, which is a problem to be solved.

Further, to achieve miniaturization in the emboss pit pattern of the controlling bit patterns 115, 215 in the control information portions 110, 210, the processing accuracy in manufacturing process needs to be improved thereby inducing an increase in production cost.

Further, if the size of the emboss pit pattern in the controlling bit pattern 115, 215 is miniaturized, it is necessary to use short wavelength laser such as blue laser as the wavelength of a pick-up laser beam, inducing an increase in part cost.

To reduce the overhead of the control information portion 210 in the high-density optical disk 200, it can be considered to adopt a method of sharing the ID portion for multiple sectors instead of the ID portions 212, 213 provided for each sector as the data identification information. However, in this case, if a beam spot of laser or the like suffers from a positional error generated from a normal access position, detection of normal access position is disabled or it takes an extremely long time for the detection, so that there is a fear that an access to a mistaken position may be made, which is a problem to be solved.

SUMMARY OF THE INVENTION

An object of the present invention is to provide a recording medium, represented by an optical disk which is capable of executing secure, rapid access action while reducing the overhead of control information portion accompanying data portion of the recording medium in order to achieve higher data density of the recording medium, represented by the optical disk capable of executing random access operation, and an access device and an access method thereof.

In a recording medium of the present invention for achieving the above-described object, an information unit group is composed by gathering a predetermined number of information units having data portions and control information portions. The information unit group has a set of group data identification information for discriminating data stored in each data portion as a whole. The control information portion has a recognition information for recognizing the information unit and its information differs among the information unit groups.

The group data identification information is data identification information for identifying data stored in a data portion in any information unit including a head section of information units constituting an information unit group or high order identification information common to respective pieces of data identification information in the information units constituting the information unit group.

This group data identification information is contained in the control information portion in a corresponding information unit of the information units constituting an information unit group.

A set of the group data identification information only needs to be stored in each information unit group and the data identification information does not need to be provided on each information unit. If the group data identification information is stored in the control information portion, the overhead occupied by the control information portion on the recording medium can be reduced without reducing the size of the emboss pit pattern. Thus, high density in the recording medium can be achieved without reducing the size of the emboss pit pattern. Consequently, improvement in processing accuracy of the emboss pit pattern accompanying the high density, employment of short wavelength for the pick-up laser beam and the like become not indispensable matters thereby suppressing increases in manufacturing cost and part cost.

As for the information unit group in the recording medium of the present invention, different information unit groups are formed between information unit access tracks running in parallel on the disk.

The recognition information is information for detecting the head position of the information unit or contains synchronizing information used upon accessing the information unit and is repeated recursively every predetermined number of the information unit groups. The predetermined number is determined based on the positional shift expected value from a normal access position and so that an information unit groups included in the positional shift expected value is uniquely identified. The positional shift expected value is a region which may be accessed away from a normal access position when an access device makes an access.

Consequently, information unit access tracks running in parallel on the recording medium are composed of different information unit groups and a different recognition information can be set for each information unit group. If it is so set that the recognition information is uniquely determined within the positional shift expected value, a positional shift of the pick-up laser beam or the like from its normal access position can be confirmed by reading the recognition information at the time of detection of the head position of each information unit or detection of the synchronizing information. The recording medium of the present invention enables the positional error to be detected rapidly.

Further, if it is so set that the recognition information is repeated recursively every predetermined number of the information unit groups located within the region of the positional shift expected value, the positional shift can be confirmed by a minimum number of kinds of the recognition information.

In the access device or access method of the present invention, a predetermined number of information units are gathered as a single group. As for the information unit group having a set of group data identification information, when a recording medium having a different recognition information depending on the information unit group is accessed, the recognition information of an accessed information unit group is detected by a recognition information detect and a recognition information expected value is generated successively by an expected value generator with a first detected recognition information as an initial value. Then, a detection result from the recognition information detector and a recognition information expected value from an expected value generator are compared with a comparator.

At this time, a timing for scanning the information unit group upon access can be measured by the measuring unit and based on this measuring result, the expected value generator is capable of changing the recognition information expected value. Here, the measuring unit is also capable of measuring based on a reference synchronizing signal.

Further, it has a recorder which stores a correspondence relation between the group data identification information and recognition information and is capable of selecting an information unit group having a recognition information supplied with a correspondence by the recorder upon access in order to detect an indicated group data identification information from the selected information unit group.

Consequently, access to a recording medium having a small overhead occupied by the control information portion can be achieved while the positional error detection is being executed rapidly.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 8 shows examples of sector mark patterns of the present embodiment;

DETAILED DESCRIPTION OF THE PREFERRED EMBODIMENTS

Figure 1:
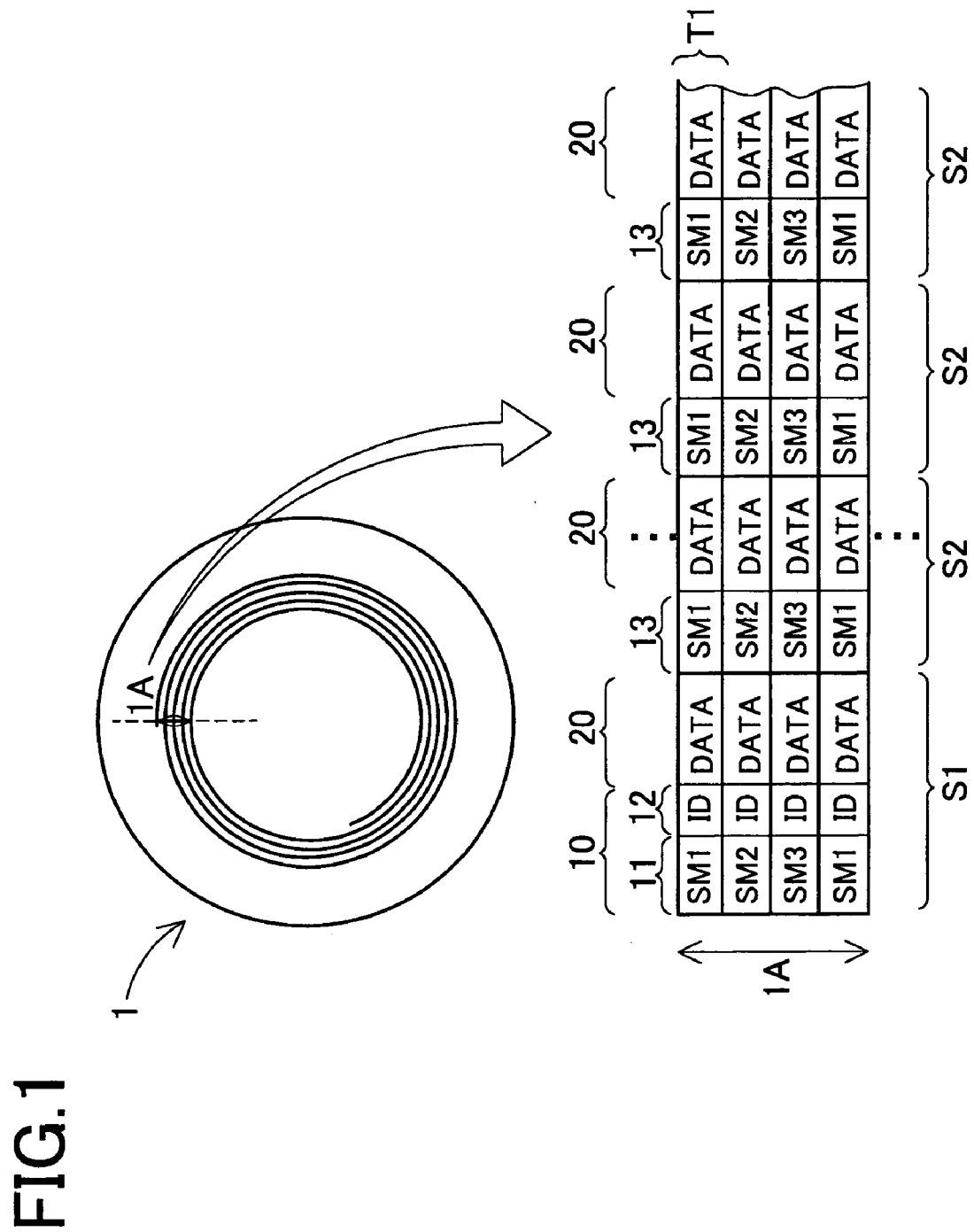
FIG. 1 is a conceptual diagram showing recording format of an optical disk of the present embodiment.

Hereinafter, the embodiment of the recording medium represented by the optical disk, access device and access method of the present invention will be described in detail with reference to FIGS. 1–8. FIG. 1 shows the optical disk 1 of this embodiment. Like the high-density optical disk 200 based on the conventional art, the land groove recording type is adopted. The data portion 20 is constructed in both the land and groove so as to achieve high density. In the optical disk 1, as shown in the enlarged view of the 4-track 1A, each track T1 includes two sectors, namely, a sector S1 containing the sector mark portion 11 and the ID portion 12 in its control information portion 10 and a sector S2 containing only sector mark portion 13. That is, the control information portion in the sector S2 is just the sector mark portion 13. The sector S1 is a first sector of the track T1 followed by the sector S2. Only the first sector Si is provided with the ID portion 12. Further, the same sector mark is disposed within the track T1 for the sector mark portion 11, 13 in the sectors S1, S2 and different sector marks are disposed among tracks. In FIG. 1, three kinds of the sector marks, SM1–SM3 are disposed repeatedly for each track T1.

The optical disk 1 having the above-described structure includes only the ID portion 12 for the first sector S1 in the track T1 containing a predetermined number of sectors as the group data identification information as compared to the conventional art of the optical disk 100 which includes the ID portion 112 as the data identification information for every sector S100 which is an information unit for constituting the track T100 as an information unit group and as compared to the conventional art of the high density optical disk 200 which includes the ID portions 212, 213 for every sector S200 which constitutes the track T200. Thus, the recording region of the control information portion 10 can be reduced as compared to the conventional art without reducing the size of the emboss pit pattern, thereby making it possible to reduce the overhead by the ID portion 12. Correspondingly, a high-density optical disk 1 which is capable of securing the data portion 20 of a larger region can be achieved. Because improvement in the processing accuracy of the emboss pit pattern and using short wavelength as the pick-up laser beam and the like become no indispensable matters with progress of higher density, increase in manufacturing cost and part cost can be blocked.

Figure 2:
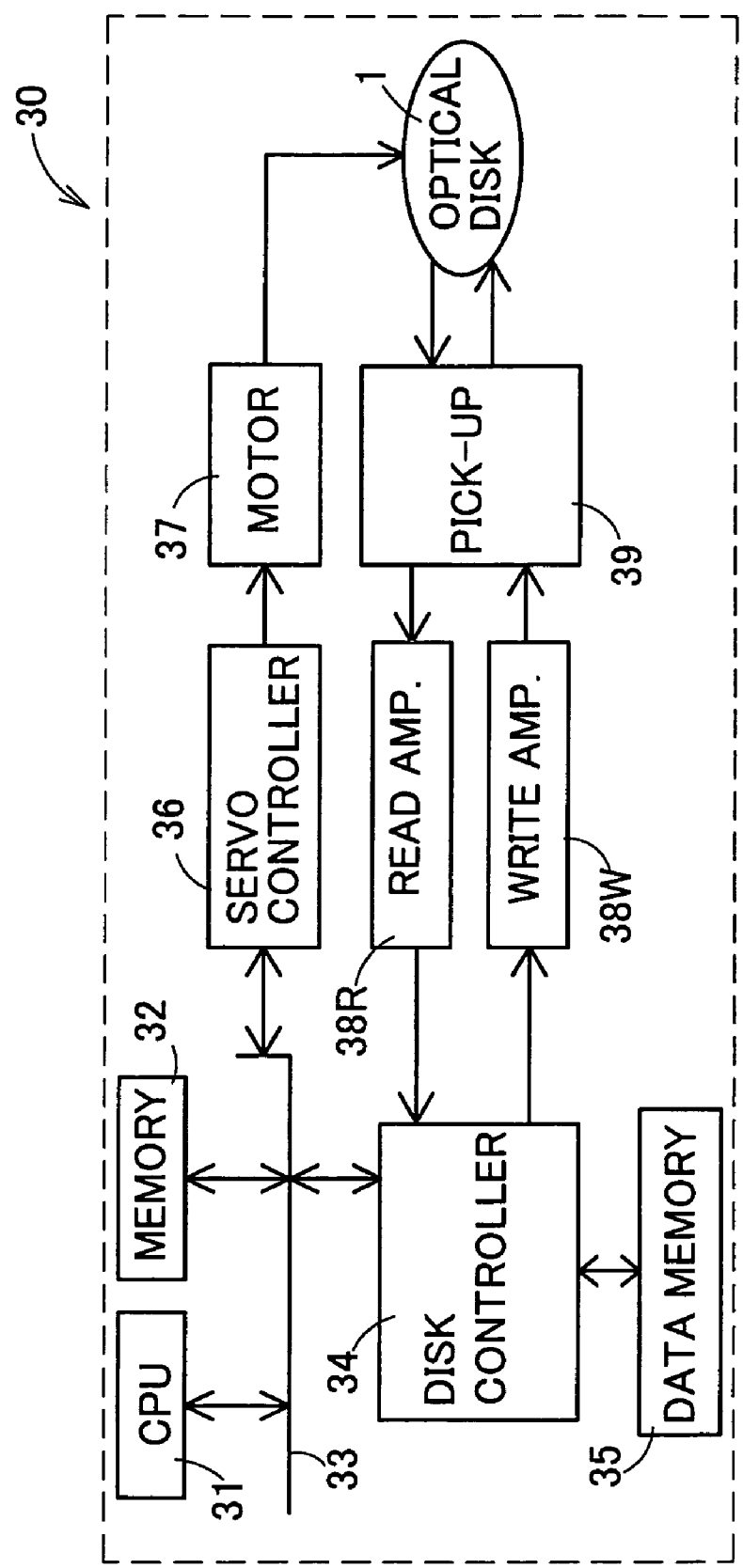
FIG. 2 is a circuit block diagram of an access device to an optical disk of the present embodiment.

FIG. 2 shows a circuit block diagram of an optical disk access device 30 which accesses to the optical disk 1 of this embodiment. A central processing unit (CPU) 31, which acquires control program and data as required and performs access control for reading and writing data from/into the optical disk 1 is connected to a memory 32, a disk controller 34 and a servo controller 36 through a bus 33. Control program and data necessary for control are stored in the memory 32 and read out according to an instruction from the central processing unit (CPU) 31 as required. The central processing unit (CPU) 31 controls access operation for the optical disk 1 according to a loaded control program with reference to data appropriately. That is, a servo controller 36 is controlled to control the rotation of the optical disk 1 upon access operation. The servo controller 36 controls a motor 37 in order to control the rotation number or the like of the optical disk 1 and the like corresponding to a control from the central processing unit (CPU) 31. On the other hand, data access is made according to an instruction to the disk controller 34. The disk controller 34, after receiving an instruction from the central processing unit (CPU) 31, carries out data input/output through a read amplifier 38R, a write amplifier 38W and an optical disk pick-up device 39. Data to be inputted or outputted at this time is subjected to a predetermined check for correcting positional error of access position, data error and the like through the read amplifier 38R and the write amplifier 38W and stored in the data memory 35.

Figure 3:
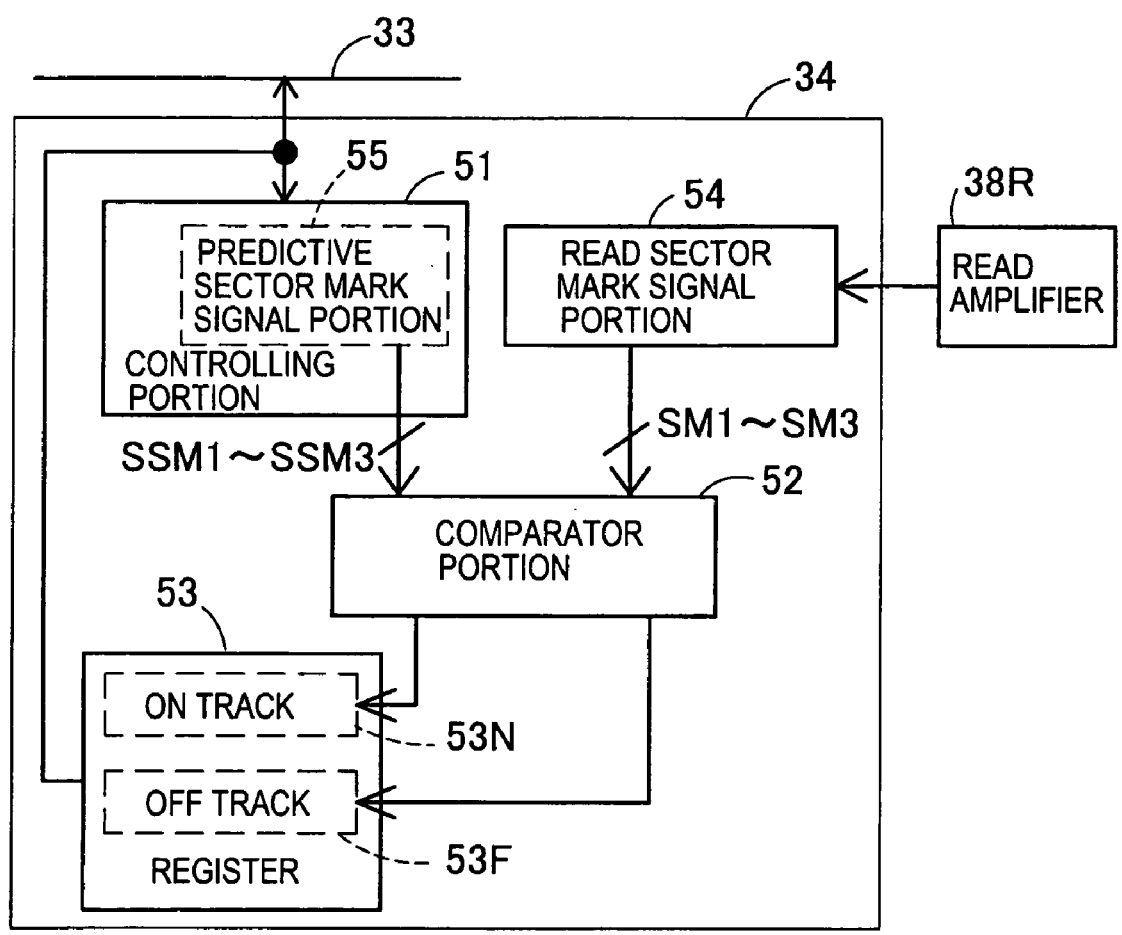
FIG. 3 is a circuit block diagram of a disk controller in the optical disk access device of the present embodiment.

FIG. 3 shows a block diagram of a circuit for detecting a positional error in access position in the disk controller 34 of the optical disk access device 30. A controlling portion 51 and a register 53 for storing a positional error result are connected to a bus 33. The controlling portion 51 is a portion for controlling data access in the disk controller 34. FIG. 3 indicates only a portion for detecting the positional error of the access position. An instruction is dispatched from the central processing unit (CPU) 31 or computation is made based on a sector position instructed by the central processing unit (CPU) 31 to be accessed and then, predictive sector marks SSM1–SSM3 are outputted successively. A predictive sector mark signal portion 55 selects a predictive sector mark signal (1–3) (SSM1–SSM3) indicating the type of outputted predictive sector marks SSM1–SSM3 and activates it.

On the other hand, a read sector mark signals (1–3) (SM1–SM3) indicating the type of read sector marks SM1–SM3 on the optical disk 1 read out by a read amplifier 38R is selected and activated by the read sector mark signal portion 54. A predictive sector mark signal (1–3) (SSM1–SSM3) outputted from the predictive sector mark signal portion 55 of the controlling portion 51 and a read sector mark signal (1–3) (SM1–SM3) outputted by a read sector mark signal portion 54 are compared by a comparator portion 52. Here, the sector marks SM1–SM3 are three kinds of marks which change repeatedly in each track T1 as shown in FIG. 1.

Therefore, the predictive sector mark signal (1–3) (SSM1–SSM3) is selected and outputted corresponding to the predictive sector mark SSM1–SSM3 indicating an access position from the predictive sector mark signal portion 55. If comparison results accord, it indicates that access operation to the optical disk 1 is made on a sector according with an instruction from the central processing unit (CPU) 31, indicating that so-called ON track state is attained, so that an ON track flag 53N is set on the register 53. If they do not accord, it indicates that the access operation to the optical disk 1 is made on a sector not according with an instruction form the central processing unit (CPU) 31, indicating that the position of the pick-up is in OFF track state away from its proper position, so that an OFF track flag 53F is set on the register 53. The content of the flag stored in this register 53 is always monitored by the central processing unit (CPU) 31 through the bus 33 and the central processing unit (CPU) 31 is capable of detecting whether or not access operation to the optical disk 1 is carried out normally.

Figure 4:
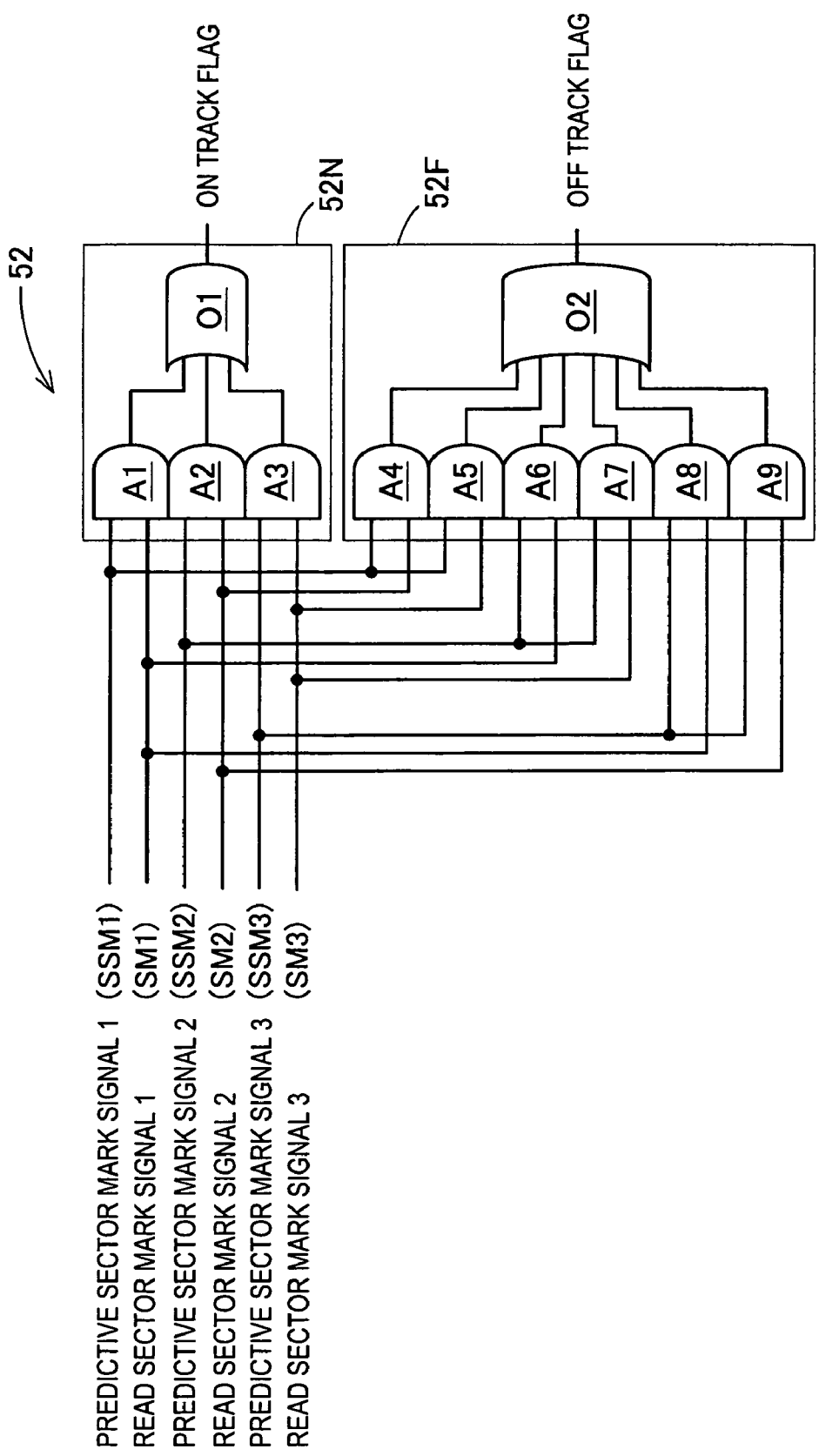
FIG. 4 is a circuit diagram showing comparator portion in the disk controller.

FIG. 4 shows an example of the circuit in a comparator portion 52. The comparator 52 shown in FIG. 4 has a circuit structure necessary for an access operation to the optical disk I in which three kinds of the sector marks SM1–SM3 are disposed in order repeatedly in each track T1 as indicated for the optical disk 1 in FIG. 1. The comparator portion 52 is comprised of an ON track detector portion 52N for detecting that the predictive sector mark signal (1–3) (SSM1–SSM3) accords with the read sector mark signal (1–3) (SM1–SM3) and an OFF track detector portion 52F for detecting that they are not accordant.

The ON track detector portion 52N includes an AND gate A1 in which predictive sector mark signal 1 (SSM1) and read sector mark signal 1(SM1) are to be inputted, an AND gate A2 in which a predictive sector mark signal 2 (SSM2) and read sector mark signal 2 (SM2) are to be inputted, an AND gate A3 in which a predictive sector mark signal 3 (SSM3) and a read sector mark signal 3 (SM3) are to be inputted and an OR gate O1 in which output signals of the AND gate A1–A3 are to be inputted. The individual AND gates A1–A3 detect for accordance between the predictive sector mark signal (1–3)(SSM1–SSM3) and the read sector mark signal (1–3) (SM1–SM3). If a read sector mark signal (any signal of 1–3) corresponding to a selected and activated predictive sector mark signal (any one of signals 1–3) is selected and activated, the output signal of a corresponding AND gate (any one AND gate of A1–A3) is activated. Because the output signal from the respective AND gates A1–A3 is inputted to the OR gate O1, the output signal from the OR gate O1 indicates that any one of the AND gates A1–A3 is activated. That is, it indicates that three kinds of the read sector marks SM1–SM3 accord with the predictive sector marks SSM1–SSM3. Therefore, with an output signal from the OR gate O1 as ON track flag signal, the ON track flag 53N can be set in the register 53.

The OFF track detector portion 52F has a similar structure. In the OFF track detector portion 52F, discordance between the predictive sector mark SSM1–SSM3 and the read sector mark SM1–SM3 is outputted from the OR gate O2 as the OFF track flag signal. Thus, it is provided with AND gates A4–A9 for detecting discordance. A predictive sector mark signal 1(SSM1) and a read sector mark signal 2 (SM2) are inputted to the AND gate A4 in order to detect that the read sector mark signal 2 (SM2) is selectively activated for the predictive sector mark signal 1 (SSM1), so that discordance between the predictive and read sector marks occurs. In the same way, the AND gates A5–A9 detect a discordance that the read sector mark signal 3 (SM3) is detected to the predictive sector mark signal 1 (SSM1), a discordance that the read sector mark signal 1 (SM1) is detected to the predictive sector mark signal 2 (SSM2), a discordance that the read sector mark signal 3 (SM3) is detected to the predictive sector mark signal 2 (SSM2), a discordance that the read sector mark signal 1 (SM1) is detected to the predictive sector mark signal 3 (SSM3) and a discordance that the read sector mark signal 2 (SM2) is detected to the predictive sector mark signal 3 (SSM3).

On the optical disk 1, the tracks T1 are so constructed to differ between access tracks running in parallel on the disk 1. For example, if a circumference of the disk 1 is formed as a track T1, different tracks T1 are formed between adjacent access tracks running in parallel on the disk 1. The sector marks SM1–SM3 include information for detecting the head position of each of the sectors S1, S2 which are information units or synchronizing information upon accessing each sector S1, S2 and a different mark of them is disposed for each track T1. Then, this arrangement is repeated recursively every predetermined number of the tracks T1. That predetermined number is determined based on a positional shift expected value as a region which may be accessed with an access position deviated from its normal position. That is, they are arranged for the track T1 included in the region of the positional shift expected value so that each different kind of the sector marks SM1–SM3 is uniquely distinguished for each track T1.

As for the optical disk 1 shown in FIG. 1, three kinds of the sector marks SM1–SM3 are arranged recursively and repeatedly. The reason why three kinds of the sector marks are used is that as the positional shift expected value, the access position may be deflected by two tracks forward or backward with respect to a normal access position. If in such a positional shift expected value, the three kinds of the sector marks SM1–SM3 are set up successively for each track, a sector mark SM1–SM3 read out when the access position is deflected is always a different mark from the sector mark SSM1–SSM3 expected to be read out at normal case, so that a positional error can be detected securely.

If this access operation to the optical disk 1 is carried out through the optical disk access device 30 described above, an OFF track flag 53F stored in the register 53 is detected immediately, and the access operation by the central processing unit (CPU) 31 is stopped, and the access operation is carried out again. If the optical disk 1 having the above-described structure is accessed by the optical disk access device 30 shown above, the access tracks in the sectors S1, S2 arranged adjacent on the disk 1 are constituted of different tracks T1. Different kinds of the sector marks, SM1–SM3, which are recognition information, may be set for each track T1. A region in which the pick-up laser beam and the like may be deflected from the normal access position is set up as the positional shift expected value and the sector marks SM1–SM3 are uniquely determined in this positional shift expected value region. Consequently, a deflection from the normal access position of the pick-up laser beam can be detected when the sector mark SM1–SM3 is read out to detect the head position of each sector S1, S2 or synchronizing information. Because the optical disk access device 30 stores this detection result in the register 53, the central processing unit (CPU) 31 always monitors the content of the register 53 through the bus 33 and detects a positional shift of the access position rapidly. Then, cancellation of the access operation and repeated access operation and the like can be carried out securely and rapidly.

Further, because the sector marks SM1–SM3 are set up so that they are repeated recursively for every predetermined number of the tracks Ti located within the region of the positional shift expected value and the positional shift can be recognized with a minimum number of the sector marks SM1–SM3.

Next, a sequence which the controlling portion 51 of the disk controller 34 sets up by changing the predictive sector mark SSM1–SSM3 successively will be described according to flow charts shown in FIGS. 5–7 as first-third specific examples.

Figure 5:
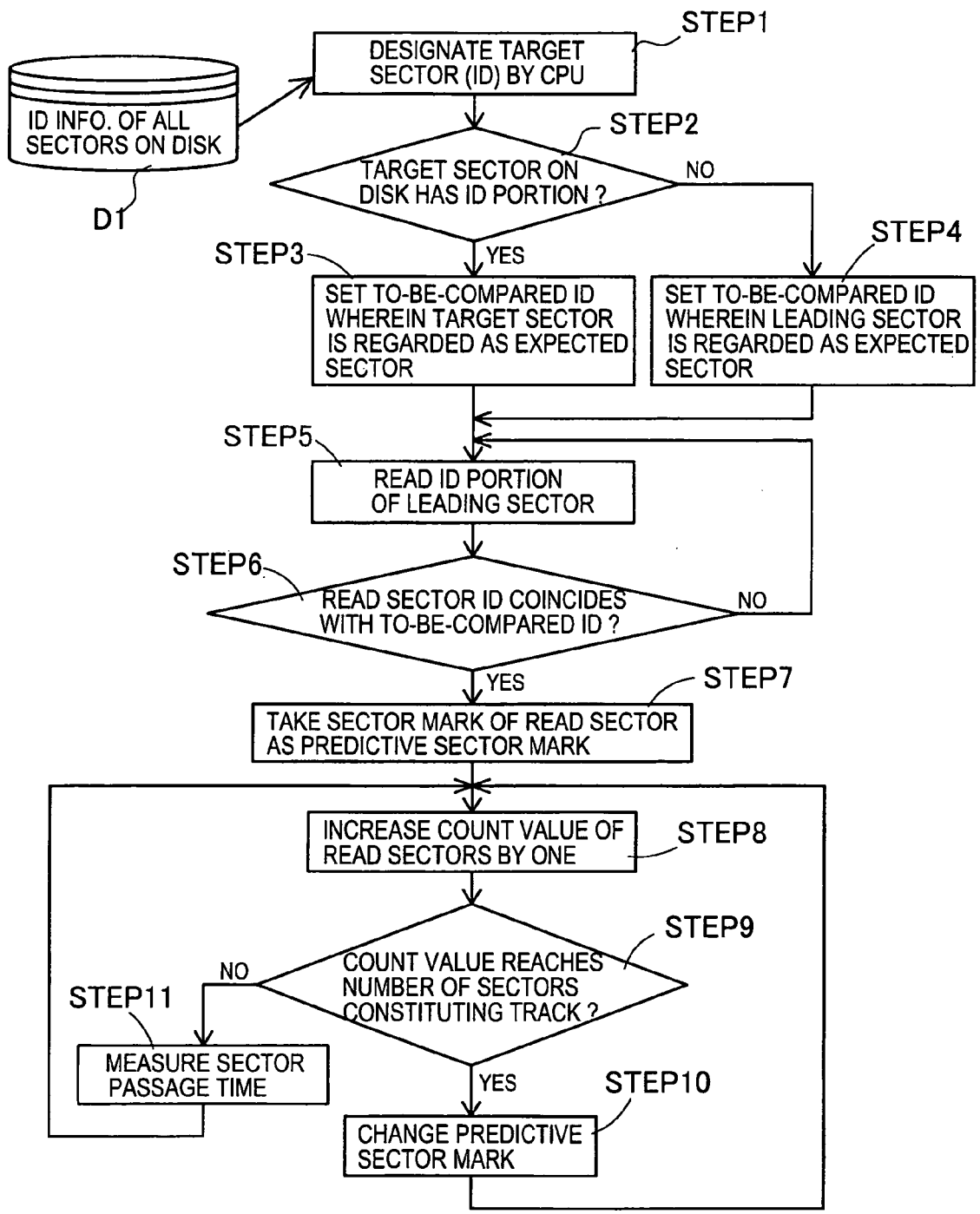
FIG. 5 is a flow chart directed to a first specific example in which a predictive sector mark is set.

FIG. 5 is a flow chart showing the first specific example. First, in step (hereinafter abbreviated as STEP) 1, a specification about a target sector which should be accessed is received from the central processing unit (CPU) 31 based on the ID information (D1) of all sectors on the optical disk 1 stored in the memory 32. This specification is carried out by specifying the ID of data identification information for uniquely identifying the data portion 20 of each sector S1, S2 on the optical disk 1. The IDs stored in the ID portion of the control information portion 10 are IDs for identifying the data portion 20 in the first sector of the track T1.

Next, whether or not the specified target sector is a first sector S1 of the track T1 and the sector SI has an ID portion is determined (STEP 2). Because if the ID portion exists (STEP2: YES), an ID corresponding to the target sector is read directly from the disk 1, to-be-compared ID is stored with the target sector regarded as an expected sector (STEP 3). Unless the ID portion exists (STEP 2: NO), the ID of the first sector S1 is computed from an ID specified with the first sector in the track T1 which the target sector belongs to regarded as the expected sector or by referring to a correspondence table or the like, a to-be-compared ID is stored (STEP 4).

Reading of the disk is started after the expected sector is determined and the ID is read out from the ID portion of the first sector S1 of each track Ti (STEP 5). Then, whether or not the ID of the read sector Si accords the to-be-compared ID is verified (STEP 6). Unless they accord (STEP 6: NO), reading of the ID portion of the first sector is continued (STEP 5). This action continues until they accord (STEP 6: YES).

When the ID of the first sector S1 accords the to-be-compared ID (STEP 6: YES), the sector mark (any mark of SM1–SM3) of the read sector is set up as a predictive sector mark (any one of SSM1–SSM3) (STEP 7). Then, to count the number of sectors to be read, a count value is added (STEP 8).

Whether or not the count value reaches the number of sectors constituting the track T1 is determined (STEP9), and unless it reaches (STEP 9: NO), a sector passage time of the pick-up is measured (STEP 11) and verification is continued by adding a count value one by one when the measurement is done (STEP 8). When the count value reaches the aforementioned predetermined value (STEP 9: YES), the predictive sector mark is changed to a mark according with a next track T1 (any mark of SSM1–SSM3) (STEP 10). After that, the procedure of STEP8–STEP 11 is repeated corresponding to access by the central processing unit (CPU) 31 to change the predictive sector mark successively.

The measurement of the sector passage time (STEP 11) is carried out by counting clock signals having a specific relation with the rotation number of the optical disk 1. The change of the predictive sector mark (STEP 10) can be conducted by referring to a sector mark table stored preliminarily according to a standard of the optical disk 1 or if there exists regularity in data structure between the sector marks shown in FIG. 8, carrying out data conversion according to that regularity.

Figure 6:
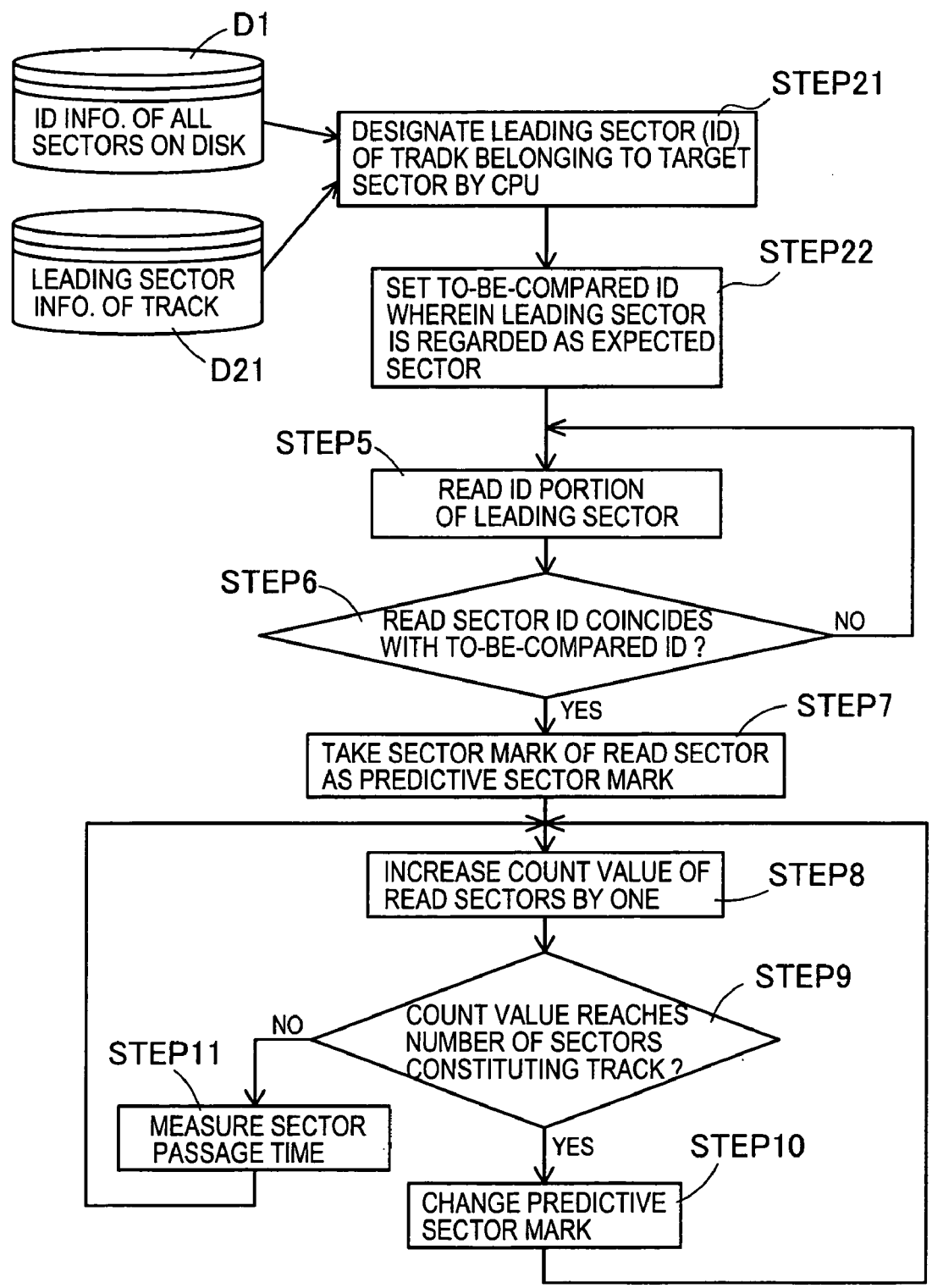
FIG. 6 is a flow chart directed to a second specific example in which a predictive sector mark is set.

FIG. 6 is a flow chart showing the sequence of the second specific example. Like step numbers are attached to the same procedure as the first specific example and then, description thereof is omitted here. In the second specific example as well as the first specific example, the first sector information (D21) of each track T1 on the optical disk 1 is stored in the memory 32. Thus, from the central processing unit (CPU) 31, a specification about the first sector S1 of the track T1 to which a target section to be accessed belongs is received based on the ID information of the sector (D1) and the first sector information (D21) (STEP 21). Then, an ID in which the first sector is specified as an expected sector is set as a to-be-compared ID (STEP 22).

That is, determination on the position of the target sector (STEP 2) and the procedure for setting the to-be-compared ID based on the determination on the position (STEP 3, STEP 4), which are to be conducted in case of the first specific example, become unnecessary.

Figure 7:
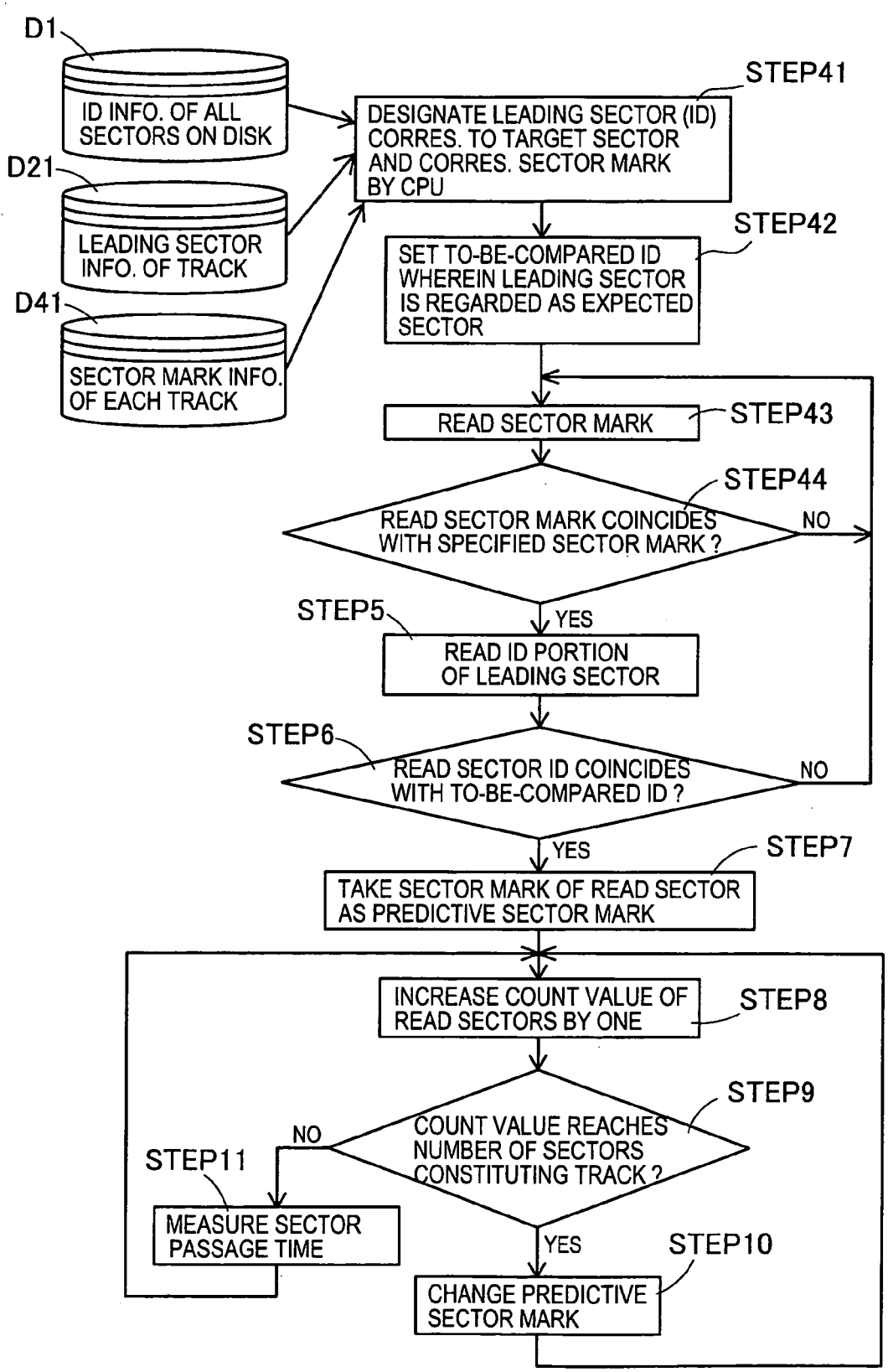
FIG. 7 is a flow chart directed to a third specific example in which a predictive sector mark is set.
Figure 9:
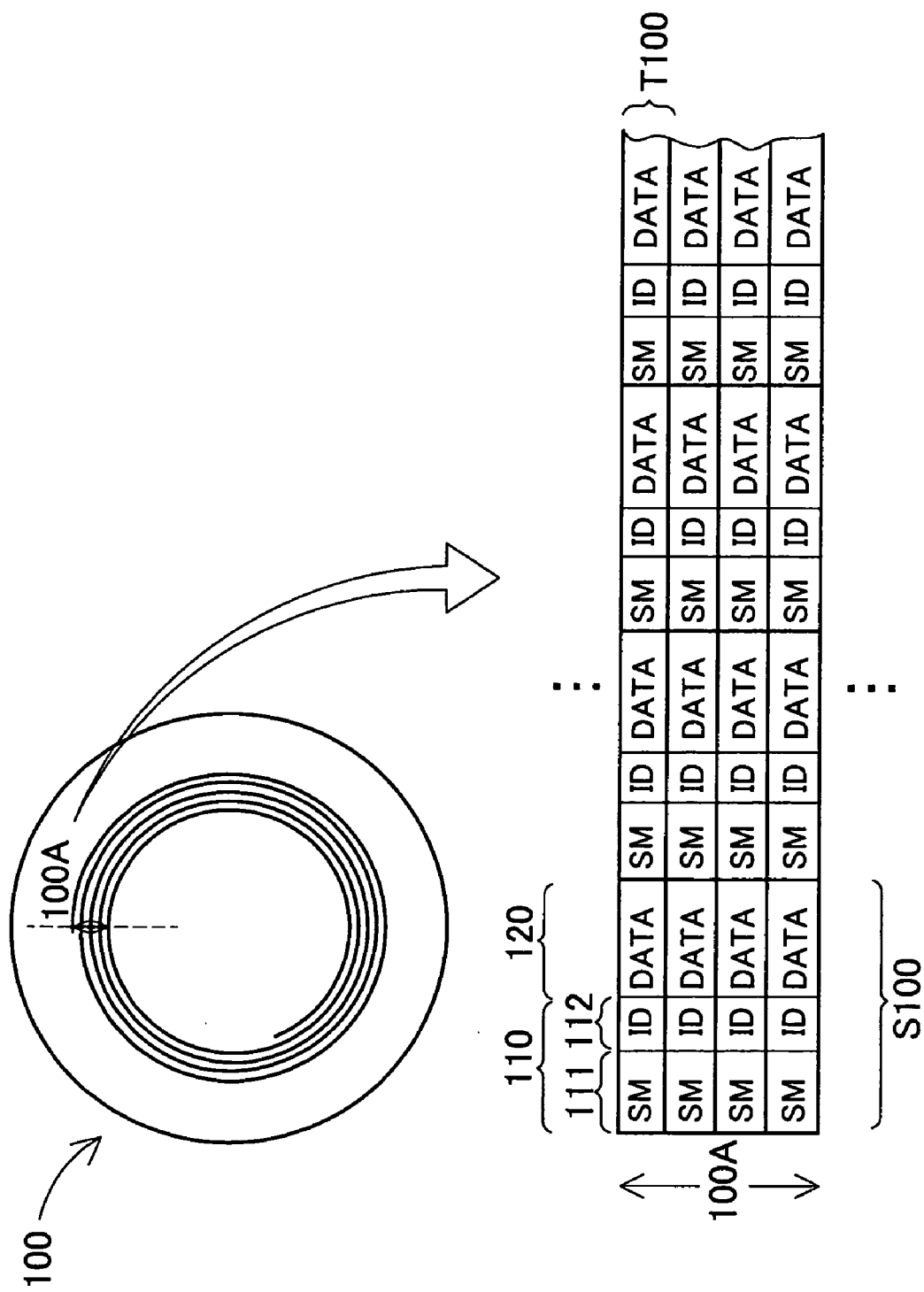
FIG. 9 is a conceptual diagram showing recording format of a conventional recoding optical disk.
Figure 10:
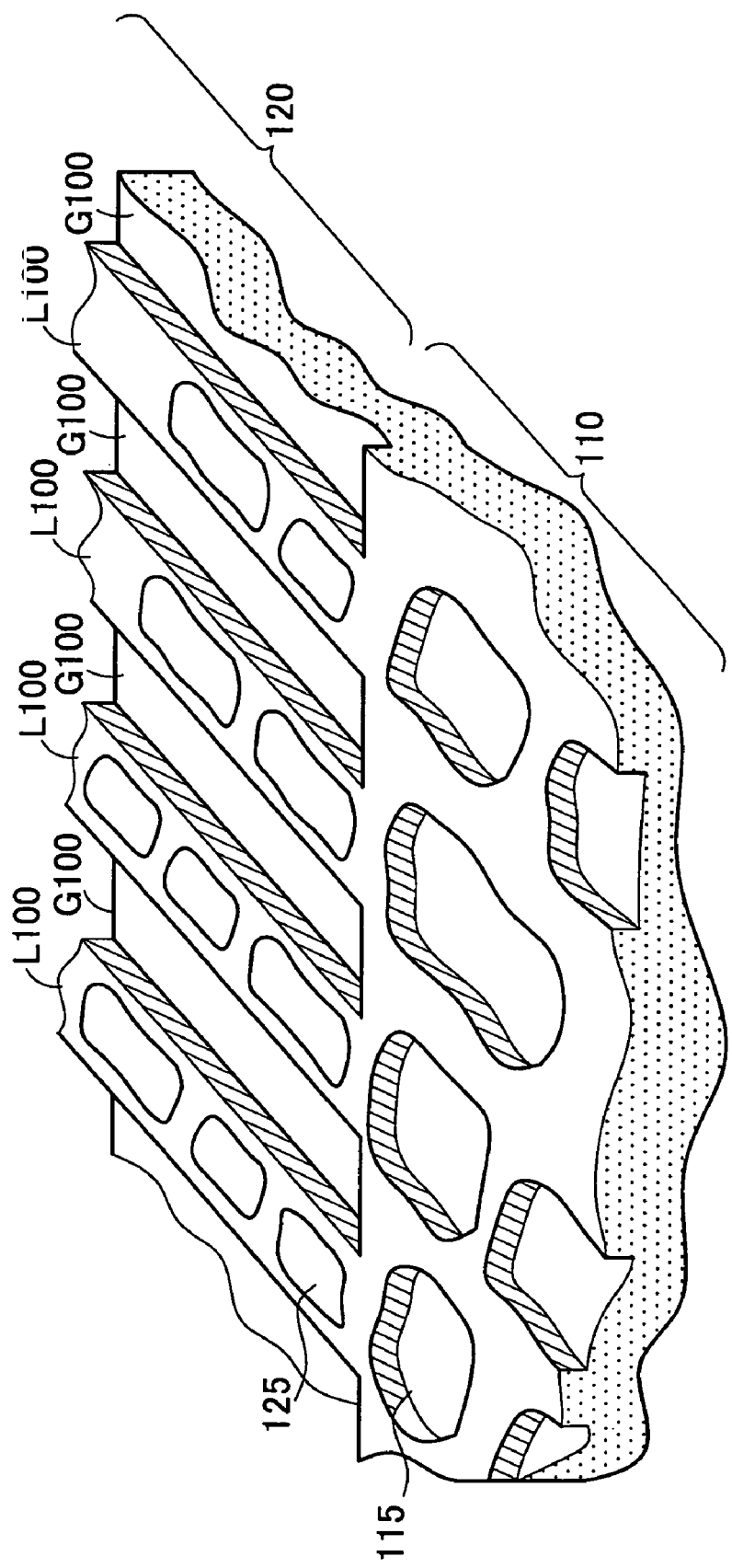
FIG. 10 is a conceptual diagram showing bit structure of the conventional optical disk.
Figure 11:
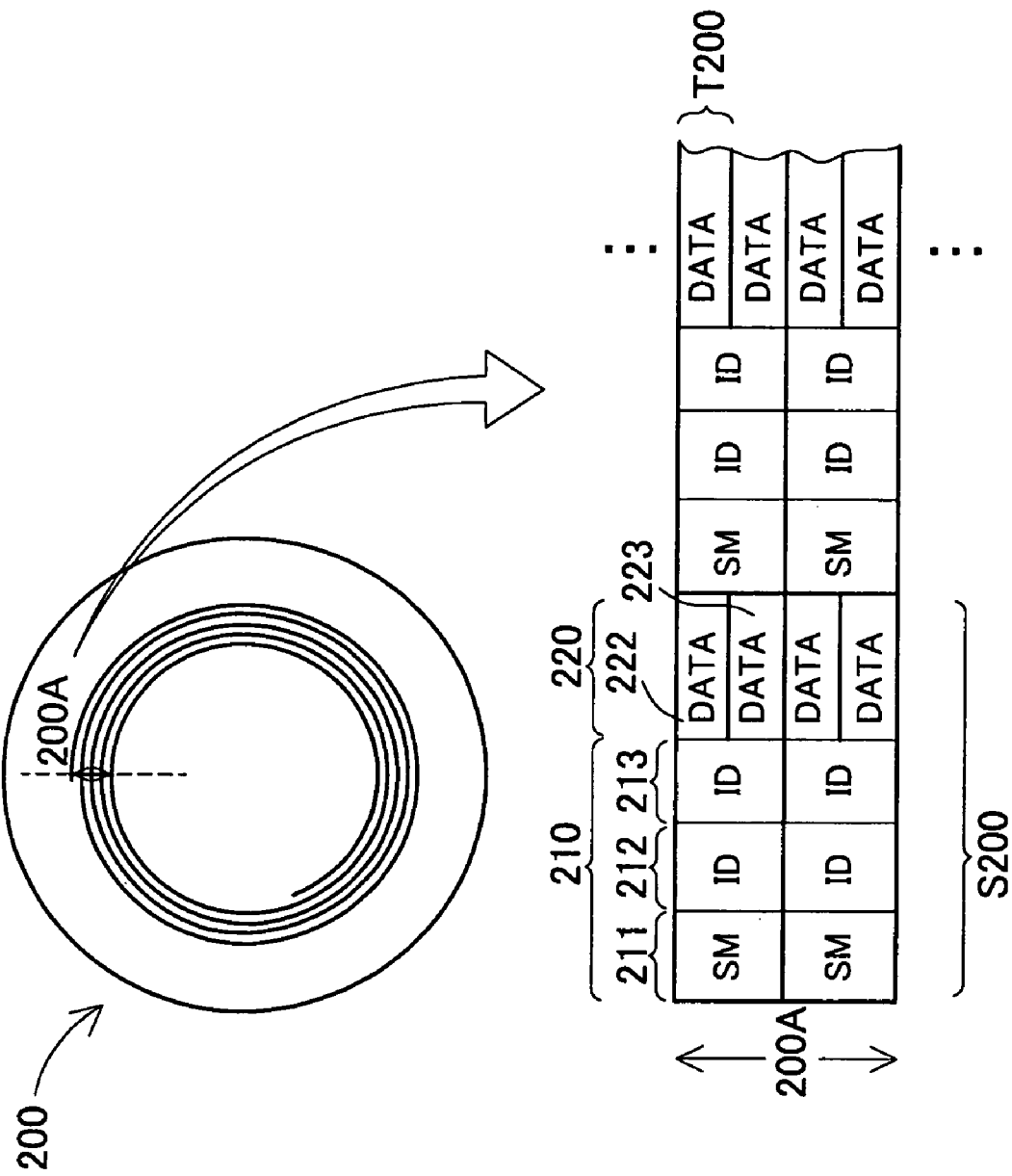
FIG. 11 is a conceptual diagram showing recording format of a conventional high-density optical disk.
Figure 12:
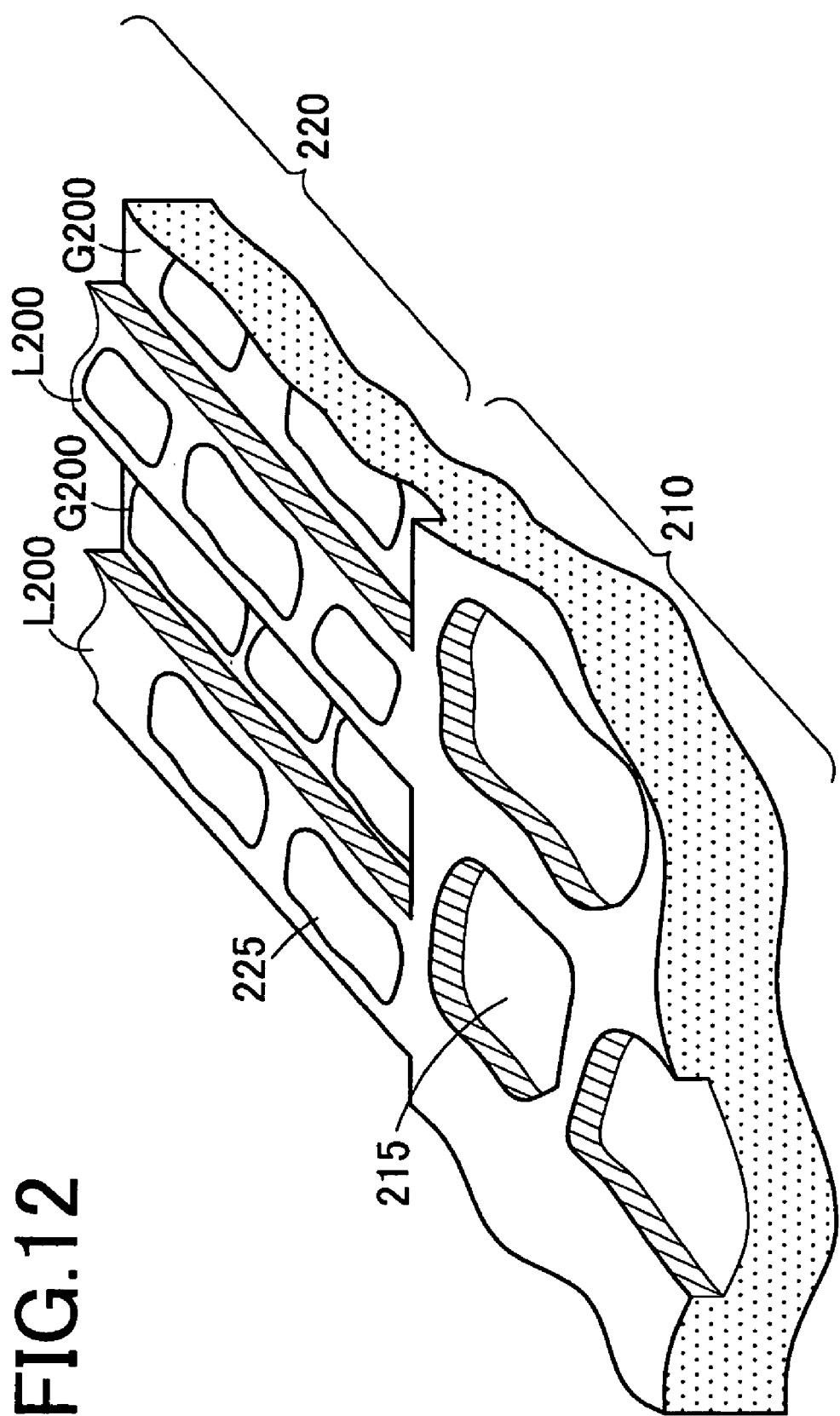
FIG. 12 is a conceptual diagram showing bit structure of the conventional high-density optical disk.

FIG. 7 is a flow chart showing a sequence of the third specific example. Like step numbers are attached to the same procedures as the first and second specific examples and then, description thereof is omitted. In the third specific example as well as the second specific example, the sector mark information (D41) of each track T1 is stored in the memory 32. Specifications about the first sector S1 of the track T1 to which the target sector to be accessed belongs and the sector mark having that track T1 are received from the central processing unit (CPU) 31 based on the sector ID information (D1), first sector information (D21) and sector mark information (D41) of each track T1. Then, a to-be-compared ID is set up with the specified first sector as the expected sector (STEP 42).

Next, the sector mark on the optical disk 1 is read (STEP 43) and the read sector mark is compared with a specified sector mark (STEP 44). Unless they accord (STEP 44:NO), the track is moved and a next sector mark is read (STEP 43). If they accord (STEP 44: YES), the ID portion of the first sector is read (STEP 5). Then, whether or not the ID of the read sector S1 accords the to-be-compared ID is verified (STEP 6). Although this ID portion reading processing is the same as the first and second specific examples, the third specific example is different from the first and second specific examples in that if the comparison results discord (STEP 6: NO), the track is moved and a next sector mark is read (STEP 43).

Because according to the predictive sector mark setting sequence of the first-third specific examples, the predictive sector marks are set up successively, the positional shift of the access position can be detected rapidly even if the ID of each sector is not detected as a result of comparison with an actually accessed sector mark.

Further because according to the second specific example, the first sector information (D21) of each track T1 on the optical disk 1 as well as the ID information (D1) of all sectors on the optical disk 1 are stored in the memory 32, the ID of the first sector of a track to which a specified target sector belongs is a preliminarily known value. Therefore, the determination on the position of the target sector (STEP 2) and the setting processing of the to-be-compared ID (STEP 3, STEP 4) become unnecessary, the to-be-compared ID can be set up according to an instruction from the central processing unit (CPU) 31 immediately (STEP 22). Thus, a rapid processing can be achieved.

Further, because according to the third specific example, the sector mark information (D41) of each track T1 as well as the ID information of the sector (D1) and the first sector information (D21) are stored in the memory 32, the sector mark of a track to which the specified target sector belongs is a preliminarily known value. Thus, upon accessing the optical disk 1, it is not necessary to read the ID portions of the first sectors S1 of all the tracks T1 and compare with the to-be-compared ID and instead, this processing needs to be carried out for only the sector mark of a specified kind. On the optical disk 1, three kinds of the sector marks are set up in succession and the processing of reading the ID of the first sector and comparing with the to-be-compared ID only needs to be executed for ⅓ the tracks 1 on the optical disk 1. Thus, a further rapid processing can be achieved.

Next, a specific example of the mark pattern of a sector mark applicable for the present invention will be described with reference to FIG. 8. FIG. 8 shows four modifications of the sector mark pattern which can be used on the optical disk 1 of the embodiment. Any example of them is a pattern modified based on odd band and even band which are conventionally used sector mark patterns shown in FIG. 13. The odd band sector mark pattern and even band sector mark pattern mentioned here are disposed on odd zones and even zones from the outside periphery of an optical disk of the conventional art, while multiple zones are set up on the disk, which is divided because the length of a single circumference differs depending on inside and outside of the disk, but not intended to identify the track which is mentioned in the present invention.

Figure 13:
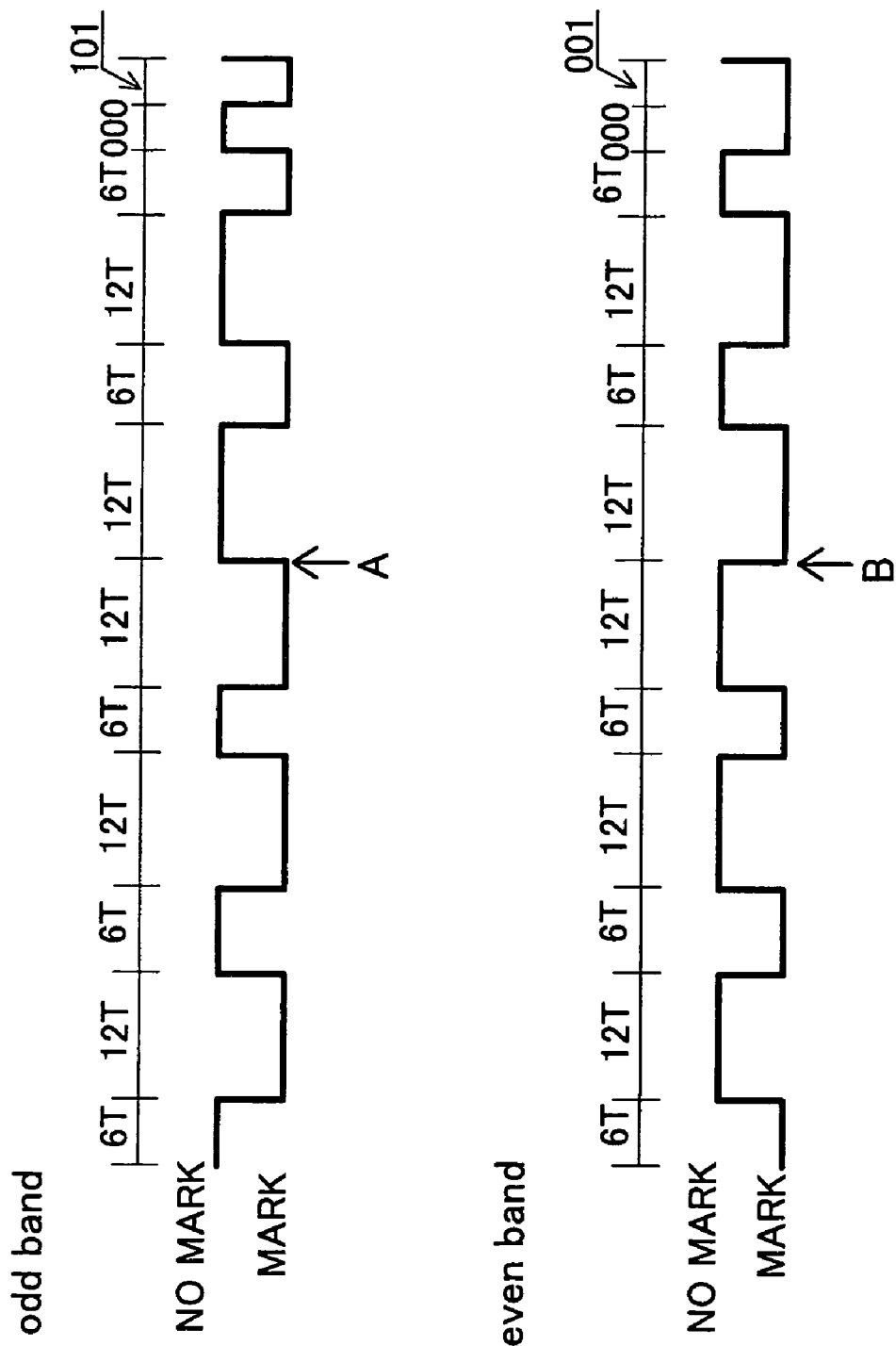
FIG. 13 shows examples of conventional sector mark patterns.

"6T" and "12T" in FIGS. 8, 13 indicate bit continuation time of 6-bit length and 12-bit length respectively. "0" and "1" indicate binary bit data. "No mark" and "mark" indicate absence or presence of an emboss pit pattern on the disk while "no mark" indicates a state in which no emboss pit exists and "mark" indicates a state having the emboss pit. The "no mark" and "mark" are read out as high/low level signal when they are read out as an electric signal by the optical disk access device 30.

The sector mark pattern of the example 1 shown in FIG. 8 is generated based on the odd band sector mark pattern in FIG. 13. With final 6-bit pattern ("000101") unchanged, a portion after the pattern position A in the odd band sector mark pattern is shifted to a preceding stage pattern while a portion before the pattern position A is disposed in a following stage pattern. The pattern sequence is a pattern in which the pattern sequence is changed over across the pattern position A as a boundary.

The sector mark pattern of the example 2 is generated based on the even band sector mark pattern of FIG. 13. With a final 6-bit pattern ("000001") unchanged, a portion after the pattern position B in the even band sector mark pattern is shifted to the previous stage pattern while a portion before the pattern position B is disposed in the following stage pattern. This is a pattern in which the pattern sequence is changed over across the pattern position B as a boundary.

The sector mark pattern of the example 3 is generated based on the sector mark pattern of the example 1. With final 6-bit pattern ("000101") unchanged, a portion after the pattern position C in the sector mark pattern of the example 1 is shifted to a previous stage pattern while a portion before the pattern position C is disposed in the following stage pattern. This is a pattern in which the pattern sequence is changed over across the pattern position C as a boundary.

The sector mark pattern of the example 4 is generated based on the sector mark pattern of the example 2. With final 6-bit pattern ("000001") unchanged, a portion after the pattern position D in the sector mark pattern of the example 2 is shifted to a previous stage pattern while a portion before the pattern position D is disposed in the following stage pattern. This is a pattern in which the pattern sequence is changed over across the pattern position D as a boundary.

FIG. 8 exemplifies four kinds of the sector mark patterns as the sector mark pattern modified based on the odd/even band sector mark pattern used in the conventional art. Additionally, other kinds of the sector mark patterns can be formed by undergoing appropriate modification such as changing over the order of the pattern position.

Further, a number of kinds of the sector mark patterns can be formed by adding a predetermined identification pattern to the existing odd/even band sector mark pattern or the modified pattern shown in FIG. 8, not by changing over the order of the pattern position of the sector mark pattern.

In the meantime, the present invention is not restricted to the above-described embodiments and needless to say, the present invention may be modified in various ways within a scope not departing from the gist of the present invention.

For example, although according to this embodiment, the three kinds of the sector marks SM1–SM3 are set up in order to cope with a case where the positional shift expected value may be deflected by two tracks forward and backward from its normal access position, the kind of the sector mark is not restricted to this example. If the positional shift expected value is of a track, it may be set to two kinds and conversely, if the positional shift expected value is of three or more tracks, it may be set to four or more kinds. Needless to say, this can be set up appropriately depending on the standard of the optical disk, optical disk access device and access method.

Although an example in which different sector marks are set up between access tracks adjacent running in parallel when the length of the track is set equal to the circumference of a disk has been described, the present invention is not restricted to this example. That is, the sector mark only needs to be uniquely set for each track within the region of the positional shift expected value including adjacent access tracks and as the length of the track, a circumference of the disk may be divided to an appropriate length. Because the circumference length differs between the inside and outside of the disk, the sections in the track occupying a single circumference of the disk may be so set as to be changeable between inside and outside. Additionally, the track sections may be set up appropriately corresponding to the characteristic of the access positional error in the optical disk, optical disk access device and the like.

Although a case where the ID portion 12 is disposed in only the first sector S1 of the track T1, the present invention is not restricted to this example. The ID portion does not always need to be disposed in the first sector as long as the sector constitutes the track, but the ID portion may be disposed for the ID in a sector located at an appropriate position.

Although it has been described that the ID disposed in the ID portion is data identification information in a disposed sector, the present invention is not restricted to this example. The disposed ID may contain only high order identification information to be applied to identify the entire track.

Although an example in which the measurement of sector passage time (STEP 11) is carried out by counting clock signals in a sequence for setting the predictive sector mark of the first-third specific examples has been indicated, the present invention is not restricted to this example, but ordinary measuring means may be applied. For example, it is permissible to set up to measure an actual time. The measuring processing may be carried out by any method, for example, hardware or software or cooperation of them.

Although for description of the present invention, the MO and DVD are exemplified as the optical disk, any other medium may be used as long as it is a medium for executing random access operation upon data. Further, needless to say, the present invention is not restricted to the optical disk.

As evident from the above description, according to the present invention, data storage capacity can be increased by compressing a region occupied by the control information portion in a recording medium which allows random access operation to a minimum, such as the optical disk without accompanying increases in manufacturing cost due to miniaturization of the medium or part cost of the access device and a positional error at an access time can be detected rapidly.

What is claimed is:

1. A recording medium comprising:
   information units each of which has a data portion and a control information portion; and
   information unit groups each unit of which is made of predetermined number of the information units, each of the information unit groups having a set of group data identification information for discriminating data stored in each data portion as a whole;
   wherein the control information portion has recognition information for recognizing the information unit, and
   the recognition information differs by each of the information unit groups.

2. A recording medium according to claim 1, wherein the group data identification information is data identification information for identifying the data stored in the data portion of any one of the information units that constitute the information unit group.

3. A recording medium according to claim 2, wherein the group data identification information is data identification information for identifying the data stored in the data portion of a leading information unit among the information units that constituted the information unit group.

4. A recording medium according to claim 1, wherein the group data identification information is high order identification information common to each data identification information of the information units that constitutes the information unit group.

5. A recording medium according to claim 1, wherein the group data identification information is included in the control information portion of-any one of the information units that constitute the information unit group.

6. A recording medium according to claim 5, wherein the group data identification information is included in the control information portion of a leading information unit among the information units that constitute the information unit groups.

7. A recording medium according to claim 1, wherein the information unit groups belong to different groups between access orbits of the information units running side by side on a disk of the recording medium.

8. A recording medium according to claim 1, wherein the recognition information includes information for detecting leading positions of the information unit.

9. A recording medium according to claim 1, wherein the recognition information includes synchronizing information to be used at the time of access to the information unit.

10. A recording medium according to claim 1, wherein the recognition information is repeated recursively by predetermined number of the information unit groups.

11. A recording medium according to claim 10, wherein predetermined number directed to information unit groups to be repeated recursively is determined basing on a positional shift expected value deviating from normal access position.

12. A recording medium according to claim 11, wherein the recognition information is discriminated uniformly for the information unit groups included within a region of the positional shift expected value.

13. A recording medium according to claim 1, the recording medium is an optical disk.

* * * * *

UNITED STATES PATENT AND TRADEMARK OFFICE
CERTIFICATE OF CORRECTION

| | | |
|---|---|---|
| PATENT NO. | : 7,123,577 B2 | Page 1 of 1 |
| APPLICATION NO. | : 10/819263 | |
| DATED | : October 17, 2006 | |
| INVENTOR(S) | : Koji Horibe | |

It is certified that error appears in the above-identified patent and that said Letters Patent is hereby corrected as shown below:

Col. 13, line 31, delete "of-any" and insert --of any-- therefor.

Signed and Sealed this

Twentieth Day of March, 2007

JON W. DUDAS
*Director of the United States Patent and Trademark Office*